United States Patent
Hu (10) Patent No.: US 8,087,053 B2
(45) Date of Patent: Dec. 27, 2011

(54) SYSTEM AND METHOD FOR TRANSMITTING AN ANIMATED FIGURE

(75) Inventor: Chia-Jung Hu, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 378 days.

(21) Appl. No.: 12/346,877

(22) Filed: Dec. 31, 2008

(65) Prior Publication Data

US 2010/0071008 A1    Mar. 18, 2010

(30) Foreign Application Priority Data

Sep. 17, 2008  (CN) .......................... 2008 1 0204541

(51) Int. Cl.
*H04N 7/16* (2011.01)
*H04N 7/18* (2006.01)
*H04W 4/00* (2009.01)

(52) U.S. Cl. ............... 725/62; 725/74; 725/81; 455/466

(58) Field of Classification Search ................... 725/62
See application file for complete search history.

(56) References Cited

U.S. PATENT DOCUMENTS

| | | | |
|---|---|---|---|
| 6,289,513 B1 * | 9/2001 | Bentwich ....................... | 717/106 |
| 2008/0013836 A1 * | 1/2008 | Nakamura et al. ............ | 382/209 |
| 2008/0039124 A1 * | 2/2008 | Linder et al. .................. | 455/466 |

* cited by examiner

*Primary Examiner* — Justin Shepard
(74) *Attorney, Agent, or Firm* — Altis Law Group, Inc.

(57) ABSTRACT

A system and a method for transmitting an animated figure between a transmitter and a receiver receives frameworks of animated figures over a communication network. The transmitter receives a selected framework, and an ID of an animated figure, extracts feature points from the selected framework, packages coordinate values of the feature points and the ID into a data package, and transmits the data package to the receiver. The receiver interprets the data packet, receives the coordinate values of the feature points and the ID, generates and displays an animated figure having the selected framework using the coordinate values of the feature points and an animated figure corresponding the ID stored in a memory of the receiver.

18 Claims, 7 Drawing Sheets

SYSTEM AND METHOD FOR TRANSMITTING AN ANIMATED FIGURE

BACKGROUND

1. Technical Field

Embodiments of the present disclosure generally relate to data transmission systems and methods, and more particularly, to a system and method for transmitting an animated figure between a transmitter and a receiver.

2. Description of Related Art

Mobile communication devices often include an instant messaging (IM) function. It has become popular to send pictures, such as emoticons, using IM. Conventionally, an existing picture that contains an animated figure must exist in a transmitter before transmitting the animated figure using a mobile communication device.

Figure 1:
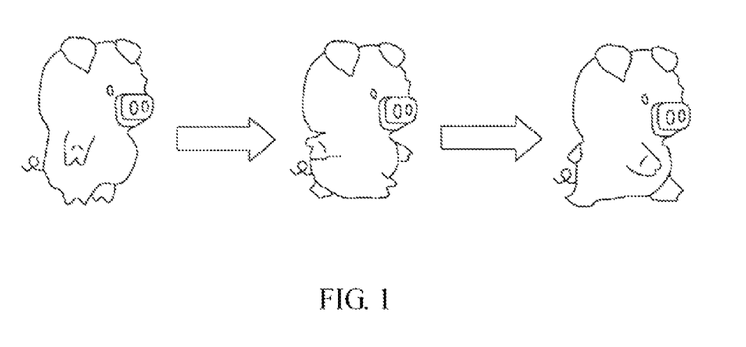
FIG. 1 illustrates an animated figure having different animated movements.

However, the above method of transmitting an animated figure to a receiver has some disadvantages. Because pictures are composed of a plurality of points, the same picture displayed on screens with different sizes may have different resolutions causing the image to be distorted. Furthermore, if an animated figure has different animated movements, such as the animated figure "pig" illustrated in FIG. 1 showing three different animated movements, then, three pictures, each of which contains a pig having a specific animated movement, must exist in the transmitter.

What is needed, therefore, is a system and a method for transmitting an animated figure between a transmitter and a receiver, which can solve above problems.

DETAILED DESCRIPTION OF CERTAIN INVENTIVE EMBODIMENTS

Figure 2:
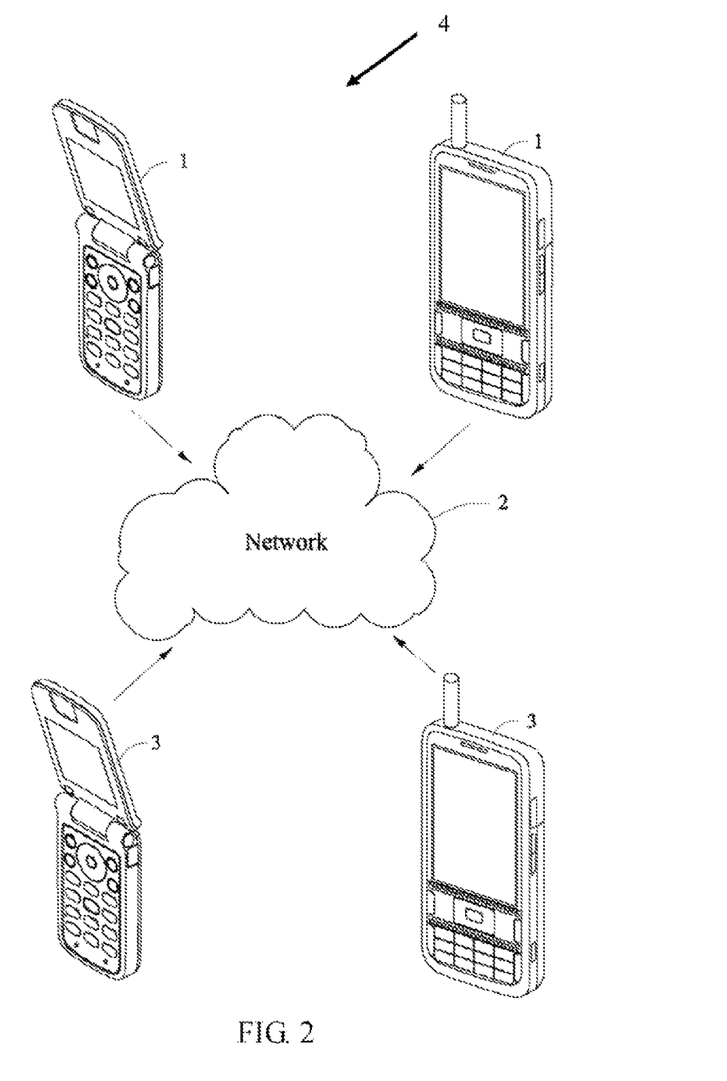
FIG. 2 is a block diagram of one embodiment of a system for transmitting an animated figure.

FIG. 2 is a block diagram of one embodiment of a system 4 for transmitting an animated figure. The system 4 can send data of a framework from a transmitter to a receiver for constructing a desired animated figure having the framework in the receiver, rather than sending a picture.

In one embodiment, the system 4 includes at least one transmitter 1 (two shown) and at least one receiver 3 (two shown). The transmitter 1 and the receiver 3 may respectively be an electronic device having a communication function, such as a mobile phone or a personal computer, and so on. In one embodiment, the transmitter 1 and the receiver 3 communicate with each other via a network 2. The network 2 may be, such as BLUETOOTH, or infrared.

Figure 3:
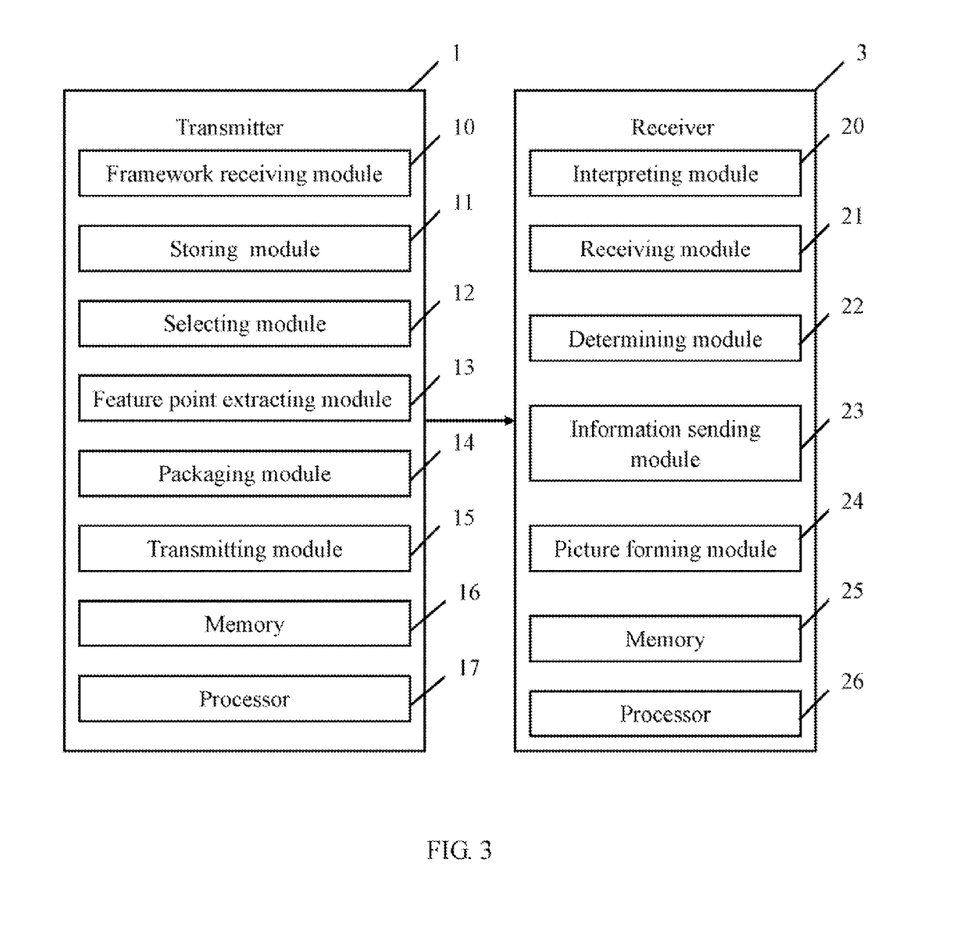
FIG. 3 is a block diagram of one embodiment of function modules of the system of FIG. 2.

FIG. 3 is a block diagram of one embodiment of function modules of the system 4 of FIG. 2. In one embodiment, the transmitter 1 of the system 4 may include a framework receiving module 10, a storing module 11, a selecting module 12, a feature point extracting module 13, a packaging module 14, and a transmitting module 15. It may be understood that, a memory 16 is installed in the transmitter 1 for storing data needed for transmitting the animated figure. In one embodiment, the data stored in the memory 16 may include a list which records an identification (ID) of each animated figure. For example, an ID of an animated figure "pig" can be "01," an ID of an animated figure "monkey" can be "02," and so on. The function modules 10~15 may comprise computerized code in the form of one or more instructions that are stored in a non-transitory storage medium. Some non-limiting examples of the non-transitory storage medium may include CDs, DVDs, flash memory, and hard disk drives. It may be further understood that, one or more specialized or general purpose processors, such as a processor 17, in the transmitter 1, can execute the one or more instructions of the function modules, to provide functions of the function modules 10~15 described in following paragraphs.

In one embodiment, the receiver 3 of the system 4 may include an interpreting module 20, a receiving module 21, a determining module 22, an information sending module 23, and a picture forming module 24. It may be understood that, a memory 25 is installed in the receiver 3 for storing data needed for receiving and constructing the animated figure. In one embodiment, the data stored in the memory 25 may include a plurality of animated figures which respectively have an ID corresponding to the ID stored in the memory 16 of the transmitter 1. The function modules 20~24 may comprise computerized code in the form of one or more instructions that are stored in the non-transitory storage medium. It may be further understood that, one or more specialized or general purpose processors, such as a processor 26, in the receiver 3, can execute the one or more instructions of the function modules, to provide functions of the function modules 20~24 described in following paragraphs.

Figure 4A:
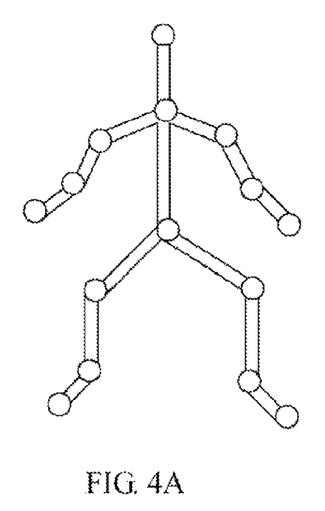
FIG. 4A and FIG. 4B illustrate a framework of an animated figure respectively.
Figure 4B:
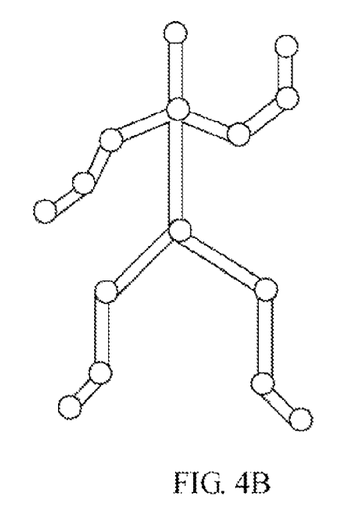

The framework receiving module 10 is configured for receiving frameworks of animated figures over a communication network. The communication network may allow the frameworks to be downloaded from the Internet or constructed and transmitted by a user using the communication network. It may be understood that a framework can express a shape showing a specific movement of various parts of an animated figure. The framework may be made up of a plurality of points. FIG. 4 illustrates two exemplary frameworks.

The storing module 11 is configured for storing the frameworks into the memory 16 of the transmitter 1.

The selecting module 12 is configured for receiving a selected framework and an ID of an animated figure from the memory 16 of the transmitter 1. The selected framework may be the one shown in FIG. 4B in one example. The selecting module 12 is further configured for receiving a selected transmission mode. The transmission mode may be a BLUETOOTH transmission or an infrared transmission.

Figure 5:
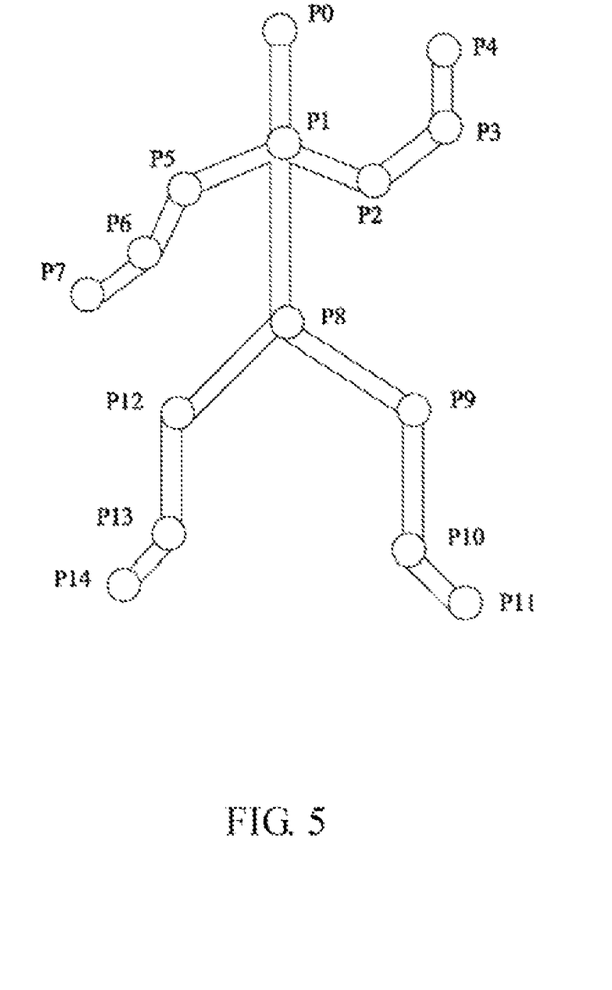
FIG. 5 illustrates feature points extracting from the framework of FIG. 4B.

The feature point extracting module 13 is configured for extracting feature points from the selected framework. It may be understood that, the feature points are main points that make up of the framework. Referring to FIG. 5, it illustrates feature points extracted from the framework of FIG. 4B. In FIG. 5, fifteen feature points P0-P14 have been extracted from the framework of FIG. 4B.

The packaging module 14 is configured for packaging data to be transmitted into a data package. The data to be transmitted may include coordinate values of the feature points, the ID, and the transmission mode.

The transmitting module 15 is configured for transmitting the data package to the receiver 3 using the transmission mode.

The interpreting module 20 of the receiver 3 is configured for interpreting the data packet to determine the transmission mode.

The receiving module 21 is configured for receiving the coordinate values of the feature points, and the ID from the transmitter 1 using the transmission mode. It may be understood that if the transmitting module 15 of the transmitter 1 transmits the data package via BLUETOOTH, the receiving module 21 of the receiver 3 is requested to receive the data package via BLUETOOTH.

The determining module 22 is configured for determining if an animated figure corresponding to the ID exists in the memory 25 of the receiver 3.

The information sending module 23 is configured for sending an error message to the transmitter 1 if the animated figure corresponding the ID does not exist in the memory 25 of the receiver 3.

The picture forming module 24 is configured for generating and displaying an animated figure having the selected framework, using the animated figure corresponding the ID and the coordinate values of the feature points, if the animated figure exists in the memory 25 of the receiver 3.

Figure 7A:
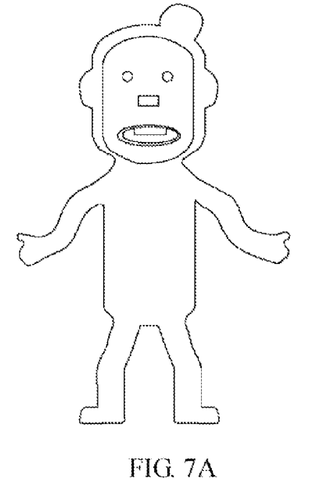
FIG. 7A and FIG. 7B illustrate an animated figure having an framework of FIG. 4A and FIG. 4B respectively.
Figure 7B:
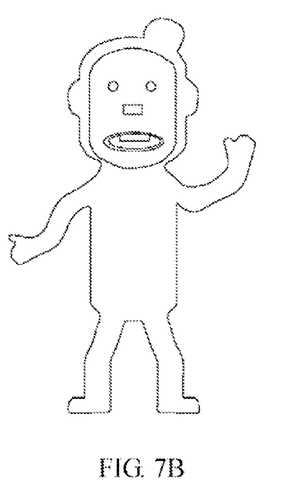

It may be understood that, the animated figure exist in the memory 25 of the receiver 3 may have an immutable animated movement given by an original framework. Using the system 4, the same animated figure can have a different animated movement given by a framework selected randomly by a user. An illustrated example can refer to FIG. 7. FIG. 7A is one exemplary animated figure having an animated movement given by an original framework shown in FIG. 4A, and FIG. 7B is an example of the animated figure having the framework shown in FIG. 4B selected by the transmitter 1.

Figure 6:
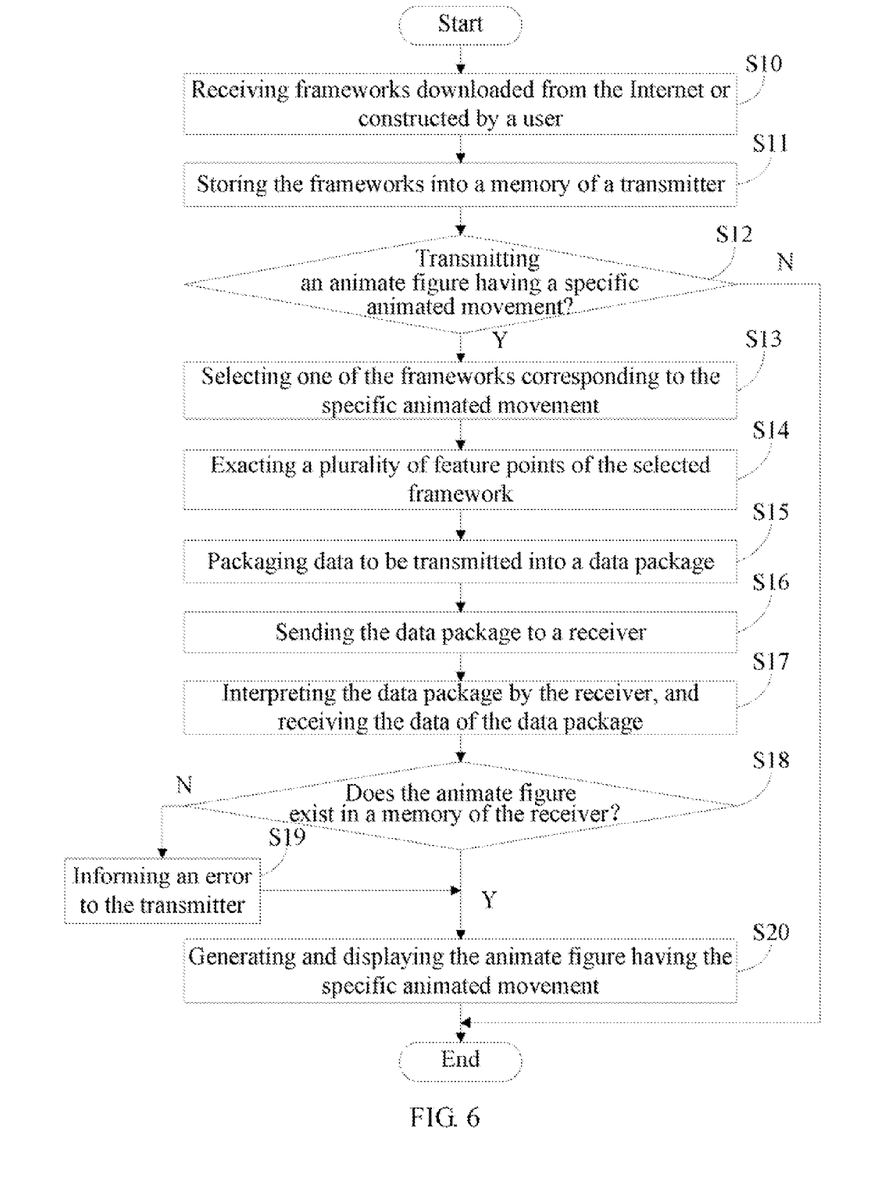
FIG. 6 is a flowchart illustrating one embodiment of a method for transmitting an animated figure.

FIG. 6 is a flowchart illustrating one embodiment of a method for transmitting an animated figure. Depending on the embodiment, additional blocks in the flow of FIG. 6 may be added, others removed, and the ordering of the blocks may be changed.

In block S10, the framework receiving module 10 receives frameworks of animated figures downloaded from the Internet or constructed by a user. As mentioned above, the framework is made up of a plurality of points.

In block S11, the storing module 11 stores the frameworks into the memory 16 of the transmitter 1.

In block S12, the selecting module 12 determines if an animated figure having a specific animated movement needs to be transmitted. If the animated figure having a specific animated movement does not need to be transmitted, the flow ends. Otherwise, the flow moves to block S13.

In block S13, the selecting module 12 receives a selected framework corresponding to the specific animated movement, an ID of the animated figure from the memory 16 of the transmitter 1, and a selected transmission mode. The transmission mode may be a BLUETOOTH transmission or an infrared transmission.

In block S14, the feature point extracting module 13 extracts feature points from the selected framework.

In block S15, The packaging module 14 makes a data package by packaging data to be transmitted. In one embodiment, the data to be transmitted may include coordinate values of the feature points, the ID, and the transmission mode.

In block S16, the transmitting module 15 transmits the data package to the receiver 3 using the transmission mode.

In block S17, the interpreting module 20 of the receiver 3 determines the transmission mode of the transmitter 1 by interpreting the data packet sent by the transmission module 14. Accordingly, the receiving module 21 receives the data in the data package comprising the coordinate values of the feature points, the ID, using the determined transmission mode.

In block S18, the determining module 22 determines if an animated figure corresponding to the ID exists in the memory 25 of the receiver 3. If the animated figure corresponding to the ID does not exist, the flow goes to block S19. If the animated figure corresponding to the ID does exist, the flow moves to block S20.

In block S19, the information sending module 23 sends an error message to the transmitter 1. The error information can tell the transmitter 1 that the transmission of the animated figure has failed because there is no corresponding animated figure existing in the receiver 3.

In block S20, the picture forming module 24 uses the animated figure corresponding to the ID and the coordinate values of the feature points to generate an animated figure, and then, displays the animated figure having the selected framework on a screen of receiver 3. Because common frameworks exists between the transmitter and the receiver, less data is transmitted over the network 2. Accordingly, time is saved because transmitting less data means less time to transmit a figure.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for transmitting an animated figure between a transmitter and a receiver, the transmitter comprising:

a framework receiving module configured for receiving frameworks of animated figures over a communication network, wherein a framework expresses a shape showing a specific movement of various parts of an animated figure;

a selecting module configured for receiving a selected framework and an identification (ID) of an animated figure, and a transmission mode for sending the animated figure to the receiver;

a feature point extracting module configured for extracting feature points from the selected framework, wherein the feature points are main points that make up of the selected framework;

a packaging module configured for packaging coordinate values of the feature points, the ID, and the transmission mode into a data package;

a transmitting module configured for transmitting the data package to the receiver using the transmission mode; and at least one processor that executes the framework receiving module, the selecting module, the feature point extracting module, the packaging module, and the transmitting module;

the receiver comprising:

an interpreting module configured for interpreting the data packet to determine the transmission mode;

an receiving module configured for receiving the coordinate values of the feature points and the ID using the transmission mode;

a picture forming module configured for generating and displaying an animated figure having the selected framework, using an animated figure corresponding the ID stored in a memory of the receiver and the coordinate values of the feature points; and at least one processor that executes the interpreting module, the receiving module, and the picture forming module.

2. The system as described in claim 1, wherein the transmitter and the receiver are both mobile phones.

3. The system as described in claim 1, wherein the transmitter further comprises:

a storing module configured for storing the frameworks into a memory of the transmitter.

4. The system as described in claim 3, wherein the memory of the transmitter further stores a list which records the identifications of the animated figures.

5. The system as described in claim 1, wherein the transmission mode is a BLUETOOTH transmission or an infrared transmission.

6. The system as described in claim 1, wherein the receiver further comprises:

a determining module configured for determining if an animated figure corresponding to the ID exists in the memory of the receiver; and an information sending module configured for sending an error message to the transmitter if the animated figure corresponding to the ID does not exist in the memory of the receiver.

7. A computer-implemented method for transmitting an animated figure between a transmitter and a receiver, the method comprising:

receiving frameworks of animated figures over a communication network, wherein a framework expresses a shape showing a specific movement of various parts of an animated figure;

receiving a selected framework, and an ID of an animated figure, and a transmission mode;

extracting feature points from the selected framework, wherein the feature points are main points that make up of the selected framework;

packaging data to be transmitted into a data package, wherein the data to be transmitted comprise coordinate values of the feature points, the ID, and the transmission mode;

transmitting the data package to the receiver using the transmission mode;

interpreting the data packet by the receiver to determine the transmission mode;

receiving the coordinate values of the feature points and the ID using the transmission mode;

generating an animated figure having the selected framework, using an animated figure corresponding the ID stored in a memory of the receiver and the coordinate values of the feature points; and displaying the animated figure having the selected framework on the receiver.

8. The method as described in claim 7, wherein the transmitter and the receiver are both mobile phones.

9. The method as described in claim 7, after receiving frameworks further comprising:

storing the frameworks into a memory of the transmitter.

10. The method as described in claim 9, wherein the memory of the transmitter further stores a list which records the IDs of the animated figures.

11. The method as described in claim 7, wherein the transmission mode is a BLUETOOTH transmission or an infrared transmission.

12. The method as described in claim 7, before generating an animated figure having the selected framework further comprising:

determining if an animated figure corresponding to the ID exists in the memory of the receiver; and sending an error message to the transmitter if the animated figure corresponding to the ID does not exist in the memory of the receiver.

13. A non-transitory storage medium having stored thereon instructions that, when executed by a processor, causing the processor to perform a method for transmitting an animated figure between a transmitter and a receiver, the method comprising:

receiving frameworks of animated figures over a communication network, wherein a framework expresses a shape showing a specific movement of various parts of an animated figure;

receiving a selected framework and an ID of an animated figure, and a transmission mode;

extracting feature points from the selected framework, wherein the feature points are main points that make up of the selected framework;

packaging data to be transmitted into a data package, wherein the data to be transmitted comprise coordinate values of the feature points, the ID, and the transmission mode;

transmitting the data package to the receiver using the transmission mode;

interpreting the data packet by the receiver to determine the transmission mode;

receiving the coordinate values of the feature points and the ID using the transmission mode;

generating an animated figure having the selected framework, using an animated figure corresponding the ID stored in a memory of the receiver and the coordinate values of the feature points; and displaying the animated figure having the selected framework on the receiver.

14. The storage medium as described in claim 13, wherein the transmitter and the receiver are both mobile phones.

15. The storage medium as described in claim 13, after receiving frameworks the method further comprising:

storing the frameworks into a memory of the transmitter.

16. The storage medium as described in claim 15, wherein the memory of the transmitter further stores a list which records the identifications of the animated figures.

17. The storage medium as described in claim 13, wherein the transmission mode is a BLUETOOTH transmission or an infrared transmission.

18. The storage medium as described in claim 13, before generating an animated figure having the selected framework the method further comprising:

determining if an animated figure corresponding to the ID exists in the memory of the receiver; and sending an error message to the transmitter if the animated figure corresponding to the ID does not exist in the memory of the receiver.

* * * * *